United States Patent Office 3,567,741
Patented Mar. 2, 1971

3,567,741
BIS-COUMARINYL COMPOUNDS
Colin Fitzmaurice and Thomas Brian Lee, Holmes Chapel, England, assignors to Fisons Pharmaceuticals Limited, Loughborough, Leicestershire, England
No Drawing. Filed Nov. 21, 1968, Ser. No. 777,868
Claims priority, application Great Britain, Nov. 22, 1967, 53,077/67
Int. Cl. C07d 7/20
U.S. Cl. 260—343.2                    9 Claims

ABSTRACT OF THE DISCLOSURE

The invention provides the bis-coumarinyl compounds of the formula:

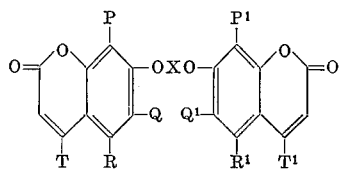

wherein Q, R, $Q^1$ and $R^1$ may be the same or different and each is selected from hydrogen; alkyl, alkoxy, substituted alkyl and alkoxy; hydroxy and halogen; P and $P^1$ are selected from hydrogen and acyl; T and $T^1$ may be the same or different and each is selected from alkyl and aryl; and X is a saturated or unsaturated, substituted or unsubstituted, straight or branched hydrocarbon chain, any carbon of which may be replaced by one or more carbocyclic or heterocyclic rings, carbonyl groups or oxygen atoms.

---

The present invention relates to new bis-coumarinyl compounds, their preparation and use.

Accordingly, from one aspect the invention provides the bis-coumarinyl compounds of the general formula:

(I)
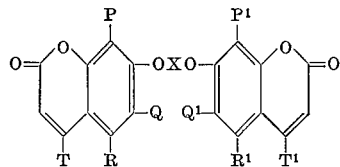

wherein Q, R, $Q^1$ and $R^1$ may be the same or different and each is selected from hydrogen; alkyl, alkoxy; substituted alkyl and alkoxy; hydroxy and halogen; P and $P^1$ are selected from hydrogen and acyl; T and $T^1$ may be the same or different and each is selected from alkyl and aryl; and X is a saturated or unsaturated, substituted or unsubstituted, straight or branched hydrocarbon chain, any carbon of which may be replaced by one or more carbocyclic or heterocyclic rings, carbonyl groups or oxygen atoms.

It is preferred that the Q, R, $Q^1$ and $R^1$ groups are selected from hydrogen; halogen, such as chlorine or bromine; hydroxy; alkyl or alkoxy groups containing from 1 to 6 carbon atoms, such as methyl, ethyl, propyl, isopropyl, butyl, or hexyl groups, and the analogous alkoxy groups; or such alkyl and alkoxy groups carrying substituents, such as halogen, hydroxy, lower alkoxy or carboxy groups, for example chloromethyl, 2-hydroxyethoxy, 2-hydroxypropoxy, 2-hydroxy isopropoxy, 2-ethoxyethoxy, carboxymethoxy and 2-carboxyethoxy groups. However, it is particularly preferred that each of Q, R, $Q^1$ and $R^1$ be hydrogen.

Suitable values for the T and $T^1$ groups include alkyl groups containing from 1 to 10, preferably 1 to 6, carbon atoms, such as methyl, ethyl, propyl, isopropyl, butyl or pentyl groups; and mono- or polybenzenoid groups such as phenyl or X- or p-naphthyl groups. It is preferred that each of the T and $T^1$ be a lower alkyl group such as a methyl or ethyl group.

Suitable values for P and $P^1$ include hydrogen and acyl groups containing from 1 to 10, preferably 1 to 6, carbon atoms. Preferred values are hydrogen and acetyl groups.

Suitable values for the X group include, branched or unbranched saturated or unsaturated polymethylene chains which may carry one or more halogen or hydroxyl substituents and may have any carbon replaced by one or more carbonyl groups or oxygen atoms. It is preferred that the X group be a $CH_2CHOHCH_2$ or $(CH_2)_m$ group wherein $m$ has a value of from 1 to 6, preferably 3 to 6.

A particularly preferred bis-coumarinyl compound of the invention is that of the formula:

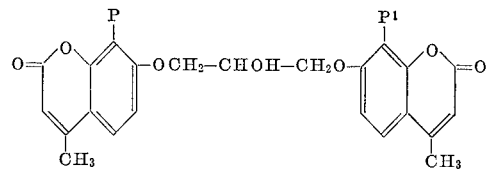

wherein P and $P^1$ are hydrogen or acetyl.

The bis-coumarinyl compounds of the invention may be prepared by a number of methods. A preferred route for preparing the bis-coumarinyl compounds comprises reacting in one or more stages a compound of the formula:

(a)

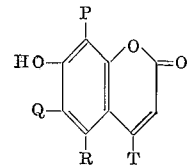

or a functional derivative of the OH group thereof and a compound of the formula:

(b)

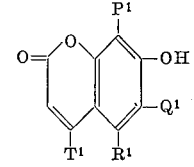

or a functional derivative of the OH group thereof with compounds of the formulae AM and BN or with a compound $AX^1B$ (wherein A and B are groups or functions including unsaturated linkages capable of reacting with the phenolic OH groups or with functional derivatives thereof such as acetoxy groups, of the compounds $a$ and $b$ to yield ether linkages and M and N are groups which upon reaction with one another yield a group $X^1$ which is either an X group or with the residues of the groups A and B forms an X group) or with precursors thereof.

The above process may be carried out in a single stage by reacting the compounds $a$ and $b$ with a compound $AX^1B$. Such a single stage process is normally used when the compounds $a$ and $b$ are the same. Alternatively the reaction may be carried out in two stages wherein first one molecule of, say, compound $a$ is reacted with the compound $AX^1B$ to produce a compound of the formula:

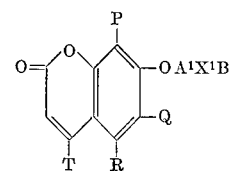

which is then reacted in a subsequent stage with the compound $b$ to produce the desired bis-coumarinyl compound. Such a two stage route is of special use when the compounds $a$ and $b$ are not the same.

As indicated above, it is also within the scope of this invention to form the —OXO— linkage or the compound $AX^1B$ in a number of steps. Thus, a compound $a$ may be reacted with a compound of formula AM, the product is then reacted with a compound NB and the product finally reacted with the compound $b$. Alternatively, the product of the reaction of $a$ and AM is reacted with the product of the reaction of $b$ and BN to obtain the desired —OXO— linkage. Such a stepwise formation of the —OXO— linkage is of use where the X group is a polymethylene chain which is interrupted by, say an ether, ketone or ester linkage. An example of suitable M and N groups for present use include those where M possesses a terminal methylene iodide group and N possesses a terminal methylene hydroxy group which may be condensed together in the presence of moist silveroxide to yield an ether linkage between the terminal methylene groups, giving for example a product of the formula:

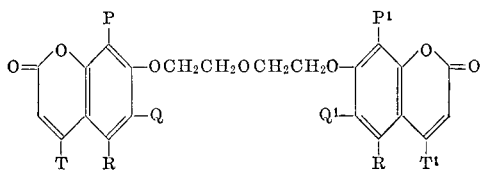

It will be appreciated that the reactive forms of the groups M and N may affect the formation of the desired ether linkages by the groups or functions A and B. It may therefore be necessary to use precursors of the M and N groups which may be activated, e.g. by the introduction of a halogen atom, after formation of the linkages by the A and B groups.

Examples of groups A and B capable of reacting with a phenolic hydroxyl group, such that an ether linkage is formed include halogen atoms, e.g. chlorine, bromine or iodine atoms, or other anion forming groups such as tosylate or methane sulphonate groups. Where the group X contains a hydroxy group beta to the subsequently formed ether linkage, A or B may represent an epoxide linkage, giving rise to a residue of —CH$_2$—CHOH. The groups A and B may be the same or different. Thus a compound A—X$^1$—B capable of yielding a 2-hydroxy-trimethylene linkage is the compound:

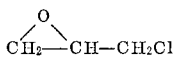

Groups capable of being converted to reactive groups such that an ether linkage may be subsequently formed include hydroxyl groups which may be converted to halogen substituents or other anion forming groups such as tosylate or methane sulphonate. A or B may also be reactive functions such as ethylenic double bonds in e.g. a vinyl group which may subsequently be converted to an epoxide or halohydrin group. Thus, an example of a compound A—X$^1$—B which may be used to produce a 2-hydroxy-trimethylene linkage is allyl bromide.

The reaction between the compounds $a$ and $b$ and the linking compound A—X$^1$—B may be carried out using the proportions and conditions normally employed for the formation of ether linkages. Thus, the reaction will generally be carried out in the presence of aqueous alkali and a solvent such as acetone or dioxan and at elevated temperature. Where the ether linkage formation is carried out by reaction of the aromatic hydroxy group and a compound A—X$^1$—B in which A and/or B is an anion forming group (e.g. halogen, methanesulphonate etc.) the reaction is desirably carried out in the presence of an acid-binding agent such as an alkali metal carbonate (e.g. sodium carbonate or potassium carbonate) or an organic acid-binding agent such as pyridine, diethylaniline or triethylamine. Where A and/or B is an epoxide linkage the ether forming reaction may be conveniently carried out in the presence of a suitable catalyst, e.g. in the presence of a quaternary ammonium hydroxide.

As has been indicated above, it is within the scope of this invention to use functional derivatives of the phenolic OH groups, such as acyloxy or benzyloxy groups, on the compounds $a$ and $b$, which functional groups are either precursors of the OH groups under the conditions of the reaction or react with the A or B groups to form an ether linkage. Thus, it is possible to employ the compounds of Formula $a$ or $b$ in the form of their acetoxy derivatives.

Where the —OXO— linkage is to be formed in a series of steps, each of these steps may be carried out in the conventional manner for forming the linkage whereby the next portion of the —OXO— linkage is secured to that portion already existing.

The starting coumarin compounds $a$ and $b$ wherein P and P$^1$ are hydrogen may themselves be obtained from the appropriate resorcinol compounds by, for example, reaction with a compound of the formula TCOCH$_2$COO Alk (wherein Alk is an alkyl group such as an ethyl group) in the presence of sulphuric acid. An example of a suitable compound of formula TCOCH$_2$COO Alk is ethyl acetoacetate, i.e. the compound where T is methyl and Alk is ethyl. The compounds $a$ and $b$ wherein P and P$^1$ are acyl groups may be prepared from those wherein P and P$^1$ are hydrogen by acylation of the free hydroxy groups and rearrangement of the acylation product by means of a Fries rearrangement.

The acetylation may be carried out at any stage in the preparation of the bis-coumarinyl compounds of the invention. Where acetylation is to be carried out after linkage of the coumarin moieties, the acetylation may be carried out using a Friedel Crafts or Hoesch reaction.

The bis-coumarinyl compounds of the invention may find use as intermediates in the preparation of a wide variety of other compounds. Thus, they may be readily hydrolysed to yield the compounds of the formula:

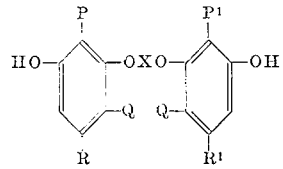

These compounds are useful, inter alia, in the preparation of bis-chromone compounds, notably bis-chromone-2-carboxylic acids and derivatives thereof which compounds in themselves possess specific activity as inhibitors of the effects of certain types of antigen antibody reaction. In this regard attention is directed to Example 5 of the present application and to U.S. application Ser. No. 536,281, filed Mar. 22, 1966, now U.S. Pat. No. 3,419,578.

EXAMPLE 1

1,3-bis(4-methyl-8-acetyl-coumarin-7-yloxy) propan-2-ol

A suspension of 109 parts of 4-methyl-7-hydroxy-8-acetyl coumarin, 35 parts of potassium carbonate, 26 parts of epichlorhydrin, 1250 parts of isopropanol and 1 part of a 40% aqueous solution of benzyl-trimethyl-ammonium hydroxide was stirred and heated under reflux for 65 hours.

1000 parts of isopropanol were removed by distillation and the thick residual slurry was diluted with 500 parts of water. The resulting solid was filtered off and recrystallised from the minimum volume of ethanol to give 16 parts of 1,3-bis(4-methyl-8-acetyl coumarin-7-yloxy) propan-2-ol as a white crystalline solid melting point 234° C.

EXAMPLE 2

1,5-bis(5-acetoxy-4-methylcoumarin-7-yloxy) pentane

A mixture of 40 parts of 5,7-diacetoxy-4-methylcoumarin, 120 parts of anhydrous potassium carbonate, 10 parts of dibromopentane, 0.5 part of sodium iodide, and 500 parts of dry acetone was stirred and refluxed for 36 hours. Most of the acetone was then removed, and the residue was diluted with water and extracted with ethyl acetate, which was washed with water, dried and evaporated to yield a brown oil. The oil was boiled with ethanol and filtered hot to leave an insoluble residue, which was recrystallised from a mixture of benzene and chloroform to yield one part of 1,5-bis(5-acetoxy-4-methylcoumarin-7-yloxy) pentane, M.P. 205–208° C.

*Analysis.*—$C_{29}H_{28}O_{10}$ requires (percent): C, 64.9; H, 5.26. Found (percent): C, 64.7; H, 5.42.

EXAMPLE 3

1,5-bis-(4-methylcoumarin-7-yloxy) pentane

A mixture of 10 parts of sodium iodide, 97 parts of 7-hydroxy-4-methylcoumarin, 138 parts of powdered potassium carbonate and 58 parts of 1,5-dibromopentane were heated under reflux in 1000 parts by volume of acetone for 48 hours. The hot acetone suspension was filtered through a preheated sintered glass funnel and the solid in the funnel washed with hot acetone, sucked dry, broken up and added slowly with stirring to 2000 parts of water. The suspension so produced was stirred for a further half hour and filtered. This insoluble solid was washed thoroughly with water, dried and recrystallised from 1000 parts by weight of 2-methoxyethanol to give 100 parts (95% of theoretical) of amorphous white solid with melting point between 176° and 178° C.

*Analysis.*—$C_{25}H_{24}O_6$ requires (percent): C, 71.4; H, 5.76. Found (percent): C, 71.4; H, 5.38.

EXAMPLE 4

1,3-bis-(4-methylcoumarin-7-yloxy) propan-2-ol

A mixture of 17.6 parts of 7-hydroxy-4-methylcoumarin, 125 parts by volume of isopropanol, 125 parts water, 2.2 parts of sodium hydroxide and 4.63 parts epichlorohydrin was heated under reflux for 3 hours, treated with a solution of 10 parts of sodium hydroxide in 50 parts of water, and heated under reflux for a further 2½ hours. Acidification of the mixture gave a brown oil which soon solidified. Several recrystallisations of the fawn coloured solid from 2-methoxyethanol gave 7.5 parts (35% of theoretical) of off white solid, melting point between 190° and 192° C.

*Analysis.*—$C_{23}H_{20}O_7$ requires (percent): C, 67.6; H, 4.93. Found (percent): C, 66.8; H, 4.90.

EXAMPLE 5

1,3-bis(4-methyl-8-acetyl coumarin-7-yloxy)-propan-2-ol (16 parts) prepared as described in Example 1 was suspended in a 10% sodium hydroxide solution (160 parts) and refluxed for three hours. On cooling and acidifying with dilute hydrochloric acid, the 1,3-bis(2-acetyl-3-hydroxyphenoxy)-propan-2-ol precipitated and was crystallised from ethanol to yield 1.3 parts thereof having a melting point of from 160 to 165° C.

A solution of 4.6 parts of 1,3-bis(2-acetyl-3-hydroxyphenoxy)propane-2-ol prepared as described above in 15 parts by volume of diethyl oxalate was added to a solution of 3 parts sodium in 30 parts by volume of ethanol and 50 parts by volume of benzene and the mixture was heated gently under reflux for 20 hours. It was then poured into a large volume of ether and the precipitated solid was filtered, washed with ether and dried. It was then dissolved in water and acidified to obtain a sticky solid. This was boiled with about 50 parts of ethanol containing a catalytic amount of hydrochloric acid for about 10 minutes, when crystals began to form. The solution was cooled and filtered to obtain a solid product. This solid was recrystallised from 200 parts by volume of a 1:2 mixture of benzene and ethanol to obtain a first crop of 4.5 parts of the diethyl ester of 1,3-bis(2-carboxy-chromon-5-yloxy) propane-2-ol melting between 180° and 182° C.

*Analysis.*—$C_{27}H_{24}O_{11}$ requires (percent): C, 61.8: H, 4.57. Found (percent): C, 61.5: H, 4.61.

A suspension of 4 parts of the diethyl ester of 1,3-bis(2-carboxychromon-5-yloxy) propane-2-ol prepared as described above in 50 parts by volume of boiling, ethanol was treated with 11.6 parts by volume of 1.015 N aqueous sodium hydroxide. Water was added until a clear solution was obtained. This was treated with charcoal, filtered and concentrated by boiling, with the occasional addition of more ethanol. On cooling 3.2 parts of colourless crystals of the disodium salt of 1,3-bis(2-carboxy-chromon-5-yloxy) propan-2-ol monohydrate were obtained.

*Analysis.*—$C_{23}H_{14}Na_2O_{11}H_2O$ requires (percent): C, 47.3; H, 3.79; Na, 7.7. Found (percent): C, 47.8; H, 3.8; Na, 7.7.

We claim:

1. A bis-coumarinyl compound of the formula:

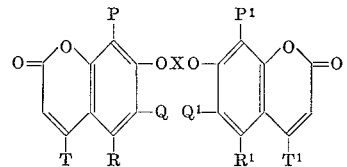

wherein Q, R, $Q^1$ and $R^1$ may be the same or different and each is hydrogen; lower alkyl or lower alkoxy; lower alkyl or lower alkoxy substituted by halogen, hydroxy, lower alkoxy or carboxy; hydroxy or halogen; P and $P^1$ are selected from hydrogen and alkanoyl containing from 1 to 10 carbon atoms; T and $T^1$ may be the same or different and each is selected from alkyl containing from 1 to 10 carbon atoms, phenyl and naphthyl; and X is

or $—(CH_2)_m$ wherein $m$ has a value of from 1 to 6.

2. A compound as claimed in claim 1, wherein Q, R, $Q^1$ and $R^1$ may be the same or different and each is selected from hydrogen, hydroxy, chlorine, bromine, lower alkoxy alkyl in which the alkyl contains from 1 to 6 carbon atoms, lower alkoxy alkoxy groups in which the alkoxy group contains from 1 to 6 carbon atoms, and the following groups containing from 1 to 6 carbon atoms, alkyl, alkoxy, hydroxy alkyl, hydroxy alkoxy, halo-alkyl.

3. A compound as claimed in claim 1, wherein P and $P^1$ may be the same or different and each is selected from hydrogen and an acetyl group.

4. A compound as claimed in claim 1, wherein T and $T^1$ may be the same or different and each is a lower alkyl group.

5. A compound as claimed in claim 1, wherein P and $P^1$ are the same and are selected from hydrogen and acetyl; Q, R, $Q^1$ and $R^1$ are all hydrogen; T and $T^1$ are both methyl and X is selected from a $—CH_2CHOHCH_2—$ group and a $(CH_2)_m$ group where $m$ is 1 to 6.

6. A compound as claimed in claim 1 which is 1,3(4-methyl-8-acetyl-coumarin-7-yloxy)propan-2-ol.

7. A compound as claimed in claim 1 which is 1,5-bis-(4-methylcoumarin-7-yloxy)pentane.

8. A compound as claimed in claim 1 which is 1,3-bis-(4-methylcoumarin-7-yloxy)propan-2-ol.

9. The compound 1,5-bis(5-acetoxy-4-methylcoumarin-7-yloxy)pentane.

References Cited

UNITED STATES PATENTS 2,831,868    4/1958    Webster et al.        260—345.2

JOHN M. FORD, Primary Examiner

U.S. Cl. X.R.

260—613, 999